(12) United States Patent
Sykes et al.

(10) Patent No.: US 7,373,856 B2
(45) Date of Patent: May 20, 2008

(54) BRAKE ACTUATOR

(75) Inventors: Michael Sykes, Orangeville (CA); Steven Demoe, Leaskdale (CA); Bob Bunker, Orillia (CA)

(73) Assignee: Ventra Group Inc., Bradford (CA)

( * ) Notice: Subject to any disclaimer, the term of this patent is extended or adjusted under 35 U.S.C. 154(b) by 69 days.

(21) Appl. No.: 10/677,250

(22) Filed: Oct. 3, 2003

(65) Prior Publication Data
US 2004/0074331 A1 Apr. 22, 2004

Related U.S. Application Data

(63) Continuation-in-part of application No. 10/146,145, filed on May 16, 2002, now abandoned.

(60) Provisional application No. 60/291,334, filed on May 17, 2001.

(51) Int. Cl.
*G05G 5/06* (2006.01)

(52) U.S. Cl. .................... 74/528; 29/892.3; 74/577 M; 74/501.6

(58) Field of Classification Search .................. 74/528, 74/523, 567, 575, 577 M, 578, 529, 535, 74/536, 540, 545, 501.6, 516; 29/892.2, 29/892.3
See application file for complete search history.

(56) References Cited

U.S. PATENT DOCUMENTS

| | | | |
|---|---|---|---|
| 2,929,345 A * | 3/1960 | Zatyko, Sr. ................. 29/892.3 |
| 3,406,440 A * | 10/1968 | Trute .......................... 29/892.3 |
| 3,566,503 A * | 3/1971 | Pacak ......................... 29/892.2 |
| 3,964,326 A * | 6/1976 | Mickus ....................... 474/174 |
| 4,850,242 A | 7/1989 | Hass et al. |
| 5,182,963 A | 2/1993 | Perisho et al. |
| 5,303,610 A * | 4/1994 | Noel et al. .................... 74/535 |
| 5,396,787 A * | 3/1995 | Kanemitsu et al. ........... 72/111 |
| 5,467,666 A | 11/1995 | Soucie et al. |
| 5,477,746 A | 12/1995 | Perisho et al. |
| 5,533,420 A * | 7/1996 | Perisho ........................ 74/512 |
| 5,832,784 A | 11/1998 | McCallips et al. |
| 5,875,688 A | 3/1999 | Porter et al. |
| 6,253,896 B1 * | 7/2001 | Notaras et al. ....... 192/105 CD |
| 6,282,980 B1 | 9/2001 | Sykes |
| 6,925,713 B1 * | 8/2005 | Kanemitsu et al. ......... 29/892.2 |

* cited by examiner

*Primary Examiner*—Thomas Williams
(74) *Attorney, Agent, or Firm*—Pillsbury Winthrop Shaw Pittman LLP

(57) ABSTRACT

The present application discloses a brake actuator for applying tension to a brake cable. The actuator includes: a mounting bracket; a brake actuator lever mounted for pivotal movement relative to the mounting bracket in brake applying and brake releasing directions; and a cam-and-drum member mounted for rotation relative to relative to the brake actuator lever. The cam-and-drum member is formed as one integral part including a protruding drum portion and a cam portion integral with the drum portion. The present application also discloses a brake actuator with a one-piece cam member.

8 Claims, 15 Drawing Sheets

BRAKE ACTUATOR

The present application claims priority as a continuation-in-part to U.S. application Ser. No. 10/146,145, filed May 16, 2002 now abandoned, and also claims priority to U.S. Provisional Application Ser. No. 60/291,334, filed May 17, 2001, the entirety of each of which is hereby incorporated into the present application by reference.

FIELD OF THE INVENTION

The present invention relates to brake actuators.

BACKGROUND OF THE INVENTION

There is an ever-present pressure in the automotive industry to lower costs, both with respect to the overall cost of the vehicle, and the various parts and components used in the vehicle. With respect to brake actuators, these devices are found in many vehicles, but their design is relatively complex, which leads to relatively high costs. The present invention endeavors to provide improvements to a brake actuator that enable part count and manufacturing complexity to be reduced relative to known brake actuators.

SUMMARY OF THE INVENTION

One aspect of the present invention provides a brake actuator for applying tension to a brake cable connected to the brake system of a motor vehicle. The actuator of this aspect of the invention comprises: a mounting bracket; a brake actuator lever mounted for movement relative to the mounting bracket in brake applying and brake releasing directions; and a cam-and-drum member mounted for rotation relative to the brake actuator lever. The cam-and-drum member is formed as one integral part including a protruding drum portion and a cam portion integral with the drum portion. The cam portion provides at least one side of a groove defining a cable guide for receiving the brake cable and enabling winding thereof onto the cam portion. A clutch releasably couples the cam-and-drum member to the brake actuator lever such that the cam-and-drum member rotates with movement of the brake actuator lever relative to the mounting bracket at least in the brake applying direction, thereby winding the brake cable onto the cam portion and applying tension to the cable for activating the brake system. The clutch is operable to release the cam-and-drum member from the lever such that the cam-and-drum member is able to rotate relative to the brake actuator lever at least when the lever is in a brake released position. A spring is connected to the cam-and-drum member and biases the cam-and-drum member in a slack take-up direction relative to the lever to wind the cable thereon for taking up cable slack when the clutch releases the cam-and-drum member from the lever.

The use of the cam portion integral with the drum portion provides a structurally sound construction that can be formed at a lower cost relative to two-piece designs.

Another aspect of the invention provides a brake actuator with an improved cam member design. The actuator of this aspect of the invention comprises a mounting bracket, a brake actuator lever, and a sheet metal cam member on the brake lever. The cam member has a flange portion deformed to define a generally U-shaped groove with integral side walls for receiving the brake cable and enabling winding thereof onto the cam member by movement of the lower in a brake applying direction relative to the mounting bracket. This applies tension to the cable for activating the brake system.

The use of a sheet metal cam member with a flange deformed in this manner is advantageous because it reduces part count relative to using two parts assembled to form the sides of the grove, as is often the case with prior art designs. It also prevents the wedging action of the brake cable between the parts in prior art designs, as the U-shape is formed by a one-piece sheet metal member.

Other objects, features and advantages of the present invention will be appreciated by the following detailed description, the accompanying drawings and the appended claims.

Another aspect of the invention provides a method of forming a brake actuator for applying tension to a brake case connected to the brake system of a motor vehicle, the method comprising: providing a brake actuator lever; providing a cam member, including deforming a sheet metal flange into a general U-shape so as to define a cable guide for receiving the brake cable and enabling winding thereof onto the cam member; providing a mounting bracket; and pivotally mounting the brake actuator lever and the cam member for pivotal movement relative to the mounting bracket in brake applying and releasing directions, the cam member being provided on the brake lever such that the movement of the brake lever in the brake applying direction winds the cable onto the cam member for applying tension to the cable for activating the brake system.

Another aspect of the invention provides a method of forming a brake actuator for applying tension to a brake cable connected to the brake system of a motor vehicle, the method comprising: forming a piece of sheet metal to initially form a cam-and-drum member having a flange portion; deforming the flange portion into a general U-shape so as to define a cable guide for receiving the brake cable and enabling winding thereof onto the cam portion; providing a mounting bracket; mounting a brake actuator lever for movement relative to the mounting bracket in brake applying and releasing directions; rotatably mounting said cam-and-drum member for rotation relative to the brake actuator lever; providing a clutch releasably coupling the cam-and-drum member to the brake actuator lever such that the cam-and-drum member rotates relative to the mounting bracket with movement of the brake actuator lever at least in the brake applying direction, thereby winding the brake cable onto the cam portion and applying tension to the cable for activating the brake system, the clutch being operable to release the cam-and-drum member from the lever such that the cam-and-drum member is able to rotate relative to the brake actuator lever at least when the lever is in a brake released position; and connecting a spring to the cam-and-drum member, the spring biasing the cam-and-drum member in a slack take-up direction relative to the lever to wind the cable thereon for taking up cable slack when the clutch releases the cam-and-drum member from the lever.

BRIEF DESCRIPTION OF THE DRAWINGS

For a better understanding of the present invention and to show more clearly how it may be carried into effect, reference will be made by way of example to the accompanying drawings, in which.

DETAILED DESCRIPTION OF THE ILLUSTRATED EMBODIMENT(S)

A prior art self-adjusting parking brake actuator is shown generally in the FIGS. 1-9 at 10. The actuator 10 is shown and described herein in a hand-operated embodiment; however, one skilled in the art will appreciate that the present invention is easily adaptable to a foot-operated configuration (not shown) and, thus such adaptation need not be discussed further in this description. This prior art construction is being described to illustrate an exemplary context for the invention and should not be considered limiting in any way.

Figure 1:
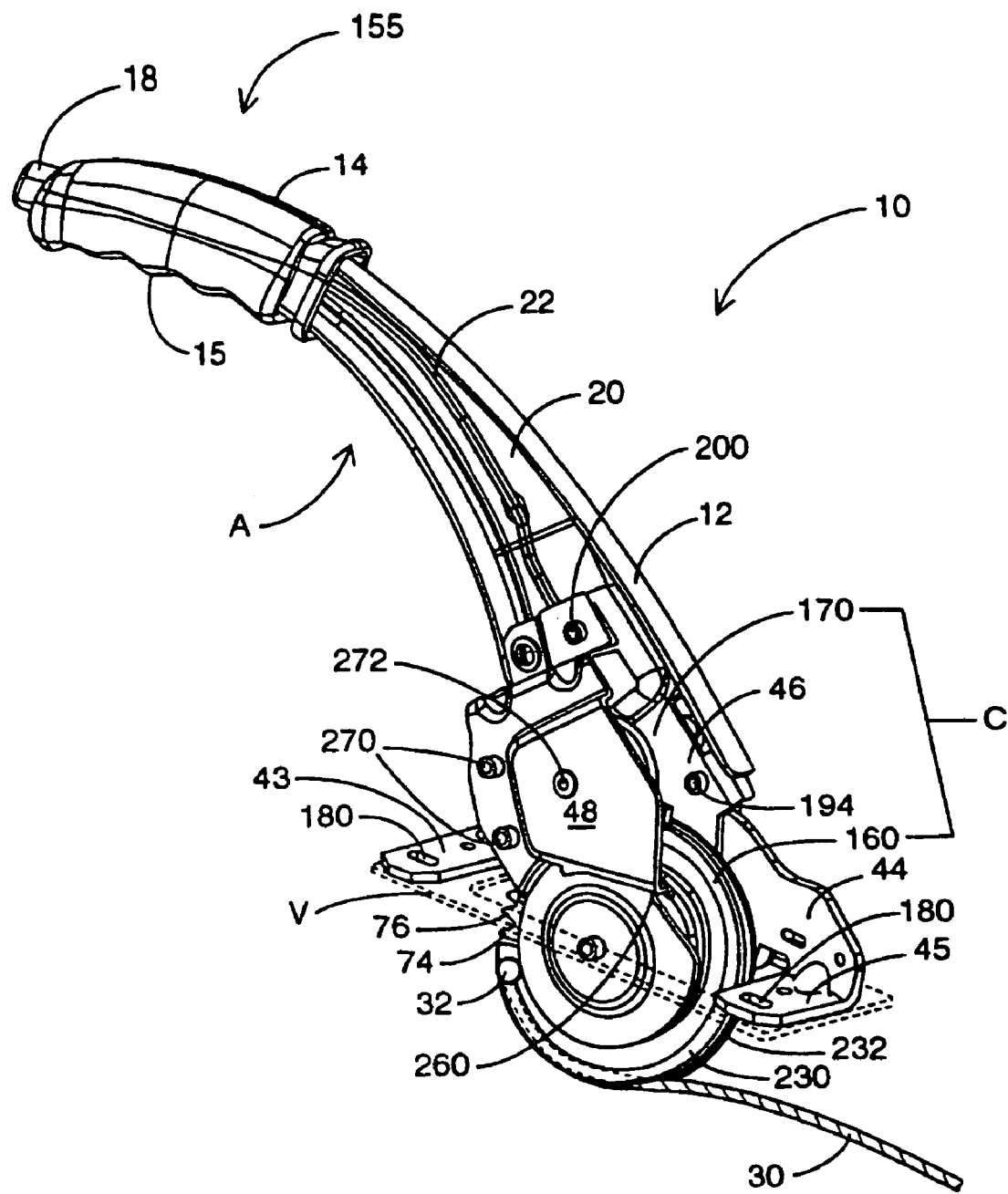
FIG. 1 is an isometric view, from the rear and to one side, of a prior art parking brake actuator.
Figure 2:
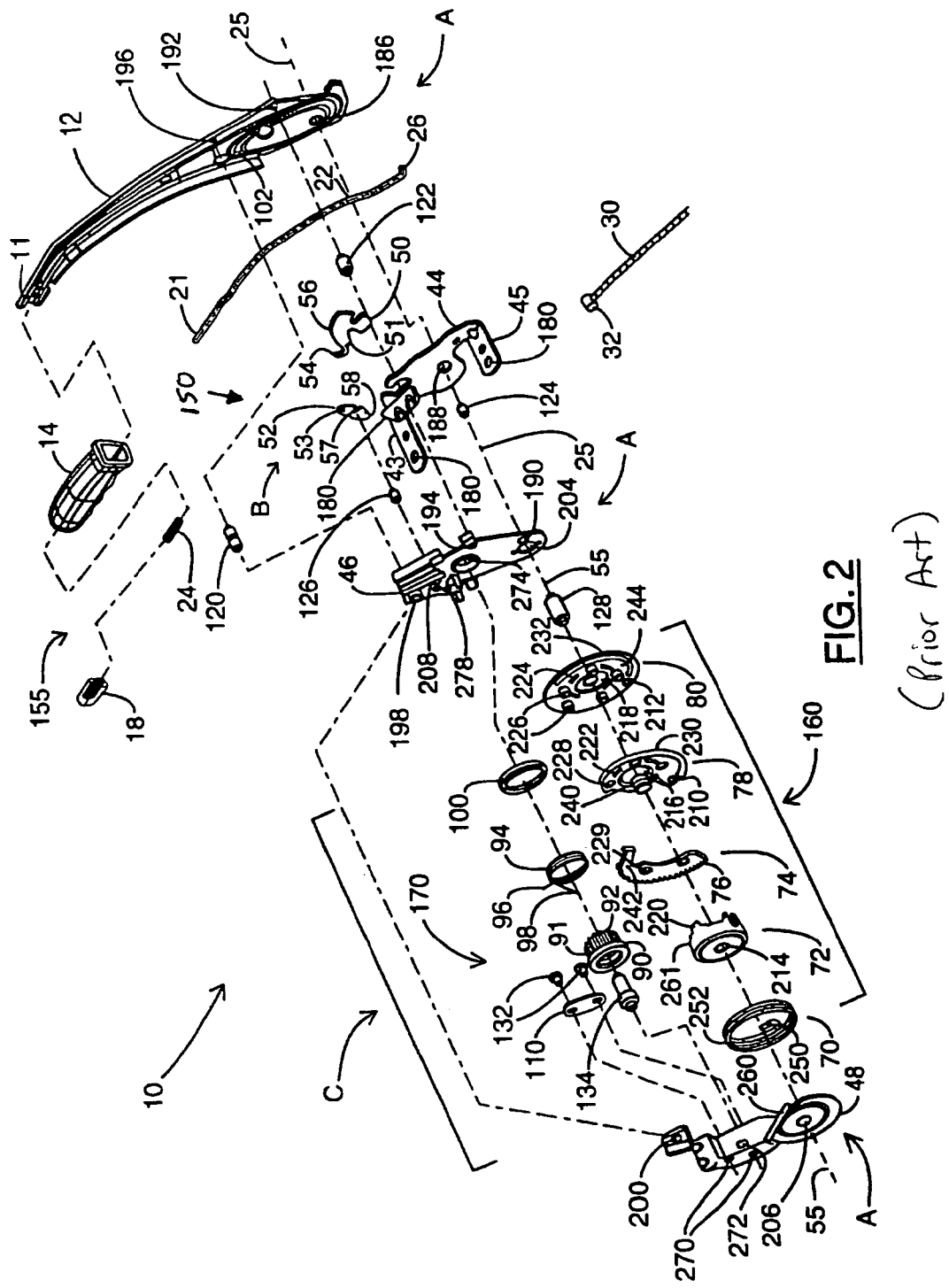
FIG. 2 is an exploded isometric view of the actuator of FIG. 1.

Referring to FIGS. 1 and 2, actuator 10 comprises a brake actuator lever assembly A, a position locking assembly B, and a tension self-adjust assembly C having a self-adjusting cam subassembly 160 and a clutch subassembly 170. A brake cable 30 is connectable to self-adjust assembly C, as will be described below.

Lever assembly A comprises a lever handle 12, an intermediate plate 46 and a cover plate 48 connected by a rivet 120 positioned through holes 196, 198, and 200, respectively. Lever 12 and intermediate plate 46 are also joined by a rivet 122, via holes 192 and 194, and by a pivot rivet 124, through holes 186 and 190. Intermediate plate 46 and cover plate 48 are also joined by a cam rivet 128, through holes 204 and 206, and a pinion rivet 134, through holes 272 and 274. Pivot rivet 124, cam rivet 128 and pinion rivet 134 also have other functions which are described in more detail below.

Lever 12 has a free end 11 having a hand grip 14 to facilitate the grasping of lever 12 by the vehicle operator. An undulating surface 15 on grip 14 is provided for the operator's comfort and increased control. Lever assembly A is rotatably mounted on a mounting bracket 44, for rotation about a fulcrum or lever axis 25 defined by pivot rivet 124 positioned through holes 186, 188, and 190 in lever 12, mounting bracket 44, and intermediate plate 46, respectively. The lever assembly A moves in opposing brake applying and releasing directions.

Mounting bracket 44 has lugs 43 and 45 for connection in any suitable manner to a motor vehicle body V, via holes 180. Brake cable 30 may be of any type and construction known in the art.

Position lock assembly B comprises a pawl subassembly 150 and a pawl release subassembly 155. Pawl subassembly 150 comprises a ratchet sector 50, having a shoulder 51 and teeth 56, and a pawl 52, having a nose 58 for engagement with teeth 56, as will be described below. Ratchet 50 also comprises a finger 54 (see also FIG. 4) for actuating clutch subassembly 170, as will be described further below. Ratchet 50 is fixedly mounted on mounting bracket 44. Pawl 52 is pivotably mounted between lever handle 12 and intermediate plate 46 by a pawl rivet 126 positioned through holes 57, 102 and 208. Pawl 52 is positioned on lever assembly A such that, as lever assembly A is rotated about lever axis 25, nose 58 of pawl 52 is continuously capable of operative engagement with teeth 56 on ratchet 50, as will be understood by one skilled in the art. Any suitable mechanism may be used in place of the pawl mechanism.

Release subassembly 155 comprises a push button 18 operatively connected to a rod 22 having ends 21 and 26. Rod 22 is substantially rigid and positioned longitudinally in an interior space 20 of lever 12. Rod end 21 is positioned adjacent lever free end 11 and cooperates with a push button 18 and a release spring 24 (see FIGS. 4 and 5). Push button member 18 is slidably mounted in grip 14 and is depressible inwardly. Release spring 24 biases push button 18 outwardly. Rod end 26 is connected to pawl 52 at a guide slot 53, on an opposite side of a pawl pivot 57 from nose 58. Spring 24 also biases rod 22 away from pawl subassembly 150 (i.e. spring 24 simultaneously pushes button 18 away from lever end 11 and pulls rod 22 towards lever end 11), and thereby biases guide slot 53 away from ratchet 50, causing nose 58 to be biased into engagement with the teeth on ratchet 50.

Self-adjust assembly C, which comprises self-adjusting cam subassembly 160 and clutch subassembly 170, is mounted to lever assembly A between intermediate plate 46 and cover plate 48, as will be described further below.

Figure 6:
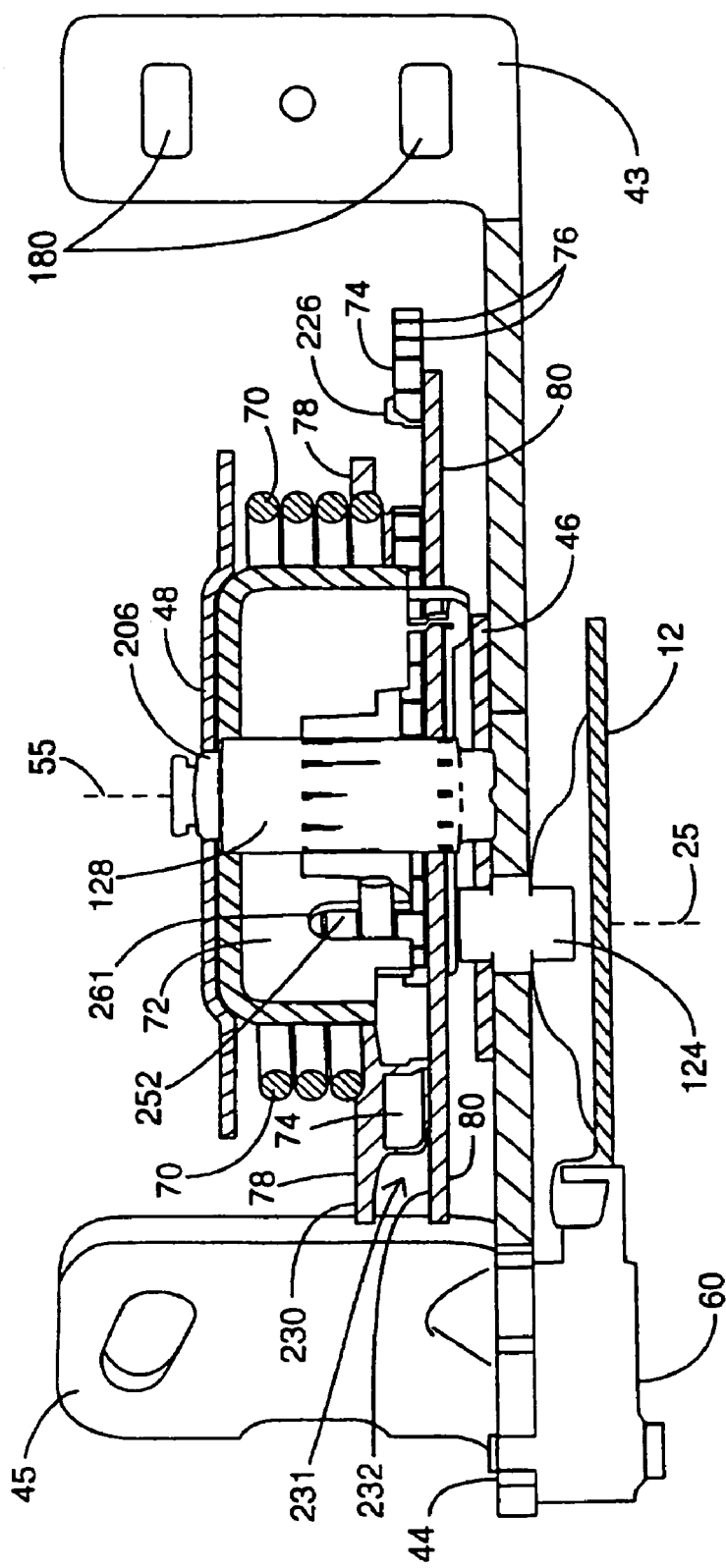
FIG. 6 is a cross-sectional view of the actuator of FIG. 1, taken along the line 6-6 in FIG. 3.

Referring to FIGS. 2 and 6, self-adjusting cam subassembly 160 comprises a drum 72, an inner cam 78, an outer cam 80, a cam sector 74 having a plurality of engagement teeth 76, and a helical self-adjust spring 70. The inner and outer cams 78 and 80 together constitute a cam or cam member (both terms may be used interchangeably) with a groove or trough defining a cable guide 231 for receiving and winding up the cable 30 therein. This may also be referred to as a take-up reel. Cam sector 76, outer cam 78 and inner cam 80 are secured to one another by bosses 226 upset in holes 228 and 229. Drum 72, inner cam 78 and outer cam 80 are secured together through the cooperation of tabs 220 and slots 222 and 224. Cam subassembly 160 is rotatably mounted to lever assembly A between cover plate 48 and intermediate plate 46 by cam rivet 128, mounted in holes 204 and 206, respectively, and passing through holes 214, 216, and 218, respectively. Intermediate plate 46 thus positions cam subassembly 160 axially adjacent to lever 12. Cam rivet 128 provides a cam axis 55 for the rotation of cam subassembly 160 therearound, as described further below. The drum 72 functions to occupy the distance between the cam and the cover plate 48 so as to provide lateral support for the cam and also maintain suitable distance for the various internal components of the actuator 10.

Figure 7:
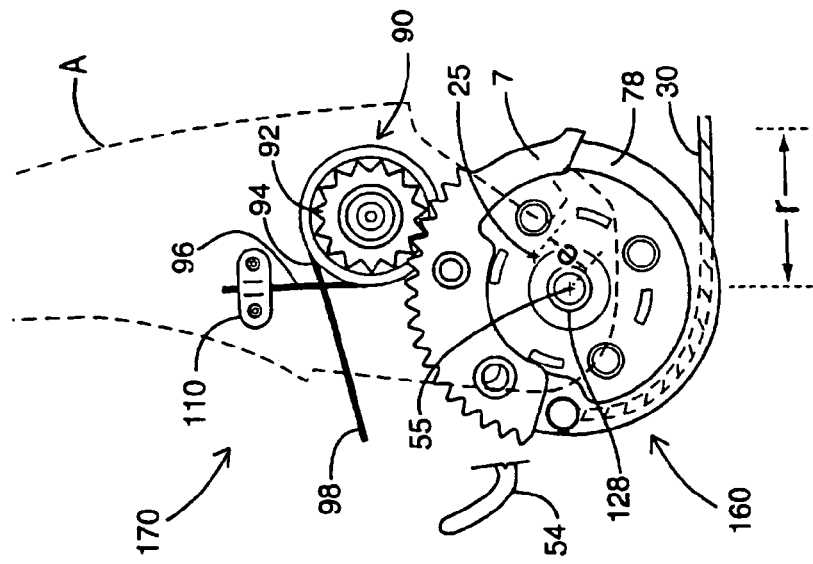
FIG. 7 is a side view of the self-adjust assembly, shown in the brake-released position.
Figure 8:
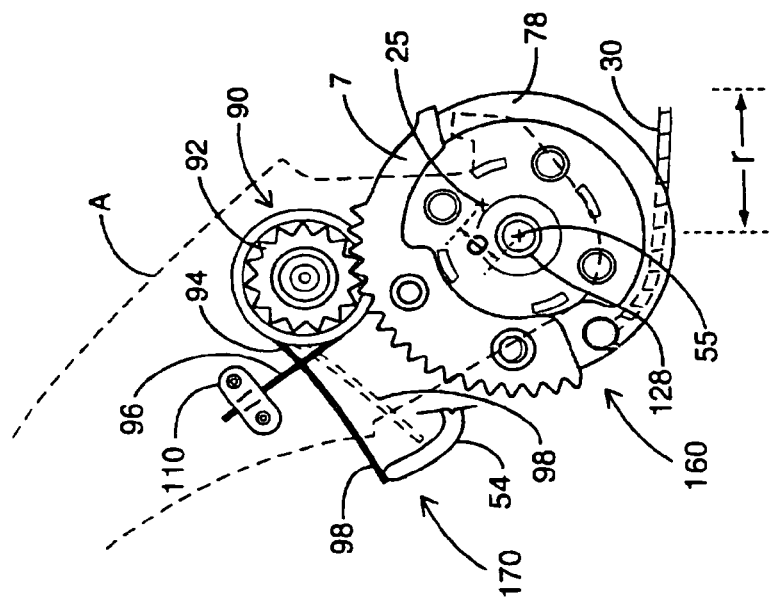
FIG. 8 is a side view of the self-adjust assembly, shown in a brake-applied position.

Referring briefly to FIGS. 6, 7 and 8, cam axis 55 is parallel to, and offset from, lever axis 25. The offset amount, indicated by reference letter "e" in the Figures, is less than the outer radius "r" of cam subassembly 160, as will be described in more detail below.

Referring again to FIGS. 2 and 6, spring 70, having an outer tang 250 and an inner tang 252, is positioned between cam subassembly 160 and lever assembly A and preferably between cam subassembly 160 and cover plate 48. Self-adjust spring 70 is mounted around drum 72, with outer tang 250 fixed to cover plate 48, by engagement of slot 260 therewith, and inner tang 252 inserted into a retention slot 261 in drum 72. The self-adjust spring 70 is installed in a pre-stressed state so as to bias the self-adjusting cam subassembly 160 in the brake-apply direction, for reasons described in more detail below. This may also be referred to as a slack take-up direction, as in certain instances the cam will rotate independently of the lever to take-up cable slack, and thus will not actually be applying the brakes. Since spring 70 is provided prior to installation in a prestressed state, suitable caging means for cam subassembly 160 may be provided.

Cam subassembly 160 has slots 210 and 212 for receiving a cable head 32, positioned on the actuator end of brake cable 30, for connecting brake cable 30 to cam subassembly 160. Outer cam 78 and inner cam 80 have flanges 230 and 232, respectively, which cooperate to form a cable guide 231 for ensuring an orderly peripheral positioning of cable 30 around cam subassembly 160, as cam subassembly 160 is rotated in the brake-apply or slack take-up direction (as seen in FIGS. 7 and 8 and described further below).

Referring again to FIG. 2, clutch subassembly 170 comprises a pinion 90, having a hub 91 and teeth 92, and a helical clutch spring 94 wrapped around hub 91. Pinion 90 is rotatably mounted to lever assembly A, preferably between cover plate 48 and intermediate plate 46 by pinion rivet 134 extending between holes 272 and 274, respectively. Spring 94 is positioned on hub 91 such that an embracing friction occurs therebetween, permitting the windings of spring 94 to securely grip hub 91. A pinion spacer ring 100 is preferably provided to impede interference between clutch spring 94 and teeth 92. Teeth 92 operatively engage teeth 76 of cam sector gear 74. Clutch spring 94 has tangs 96 and 98.

Referring to FIGS. 7 and 8, tang 96 is fixed to cover plate 48 by an anchor clip 110 held by a pair of anchor rivets 132 in holes 270. Tang 98, however, remains free for selectively tabbing thereof by finger 54, which is on ratchet sector 50 and constitutes a clutch spring release, as will be described in more detail below.

As will be understood by one skilled in the art, spring 94 is oriented on hub 91 of pinion 90 such that rotation of pinion 90 in a clockwise direction (with reference to FIGS. 5, 7, 8) tends to wind spring 94 more tightly around hub 91, through the frictional contact of hub 91 and spring 94. Further, it will be understood by one skilled in the art that, while spring 94 may be fabricated from stock having a rounded cross-section, a rectangular cross-section spring is desired to increase the contact surface area between spring 94 and hub 91, thereby increasing the gripping ability of spring 94. Also, it will be understood by one skilled in the art that the friction between spring 94 and hub 91 is sufficient to permit clutch subassembly 170 to resist counter-rotation of cam subassembly 160, in response to an induced tension in cable 30. As a result, when lever assembly A is moved from the brake-released to brake-applied positions, clutch subassembly 170 locks cam subassembly 160 sufficiently so that cam subassembly 160 rotates with lever assembly A without slipping. Finally, it will be understood that the interference fit of spring 94 must also be loose enough so that, when free tang 98 is tabbed by finger 54 when actuator 10 is in the brake-released position (as will be described below), pinion 90 is permitted to rotate freely within spring 94, thereby unlocking cam subassembly 160 from lever assembly A.

Figure 3:
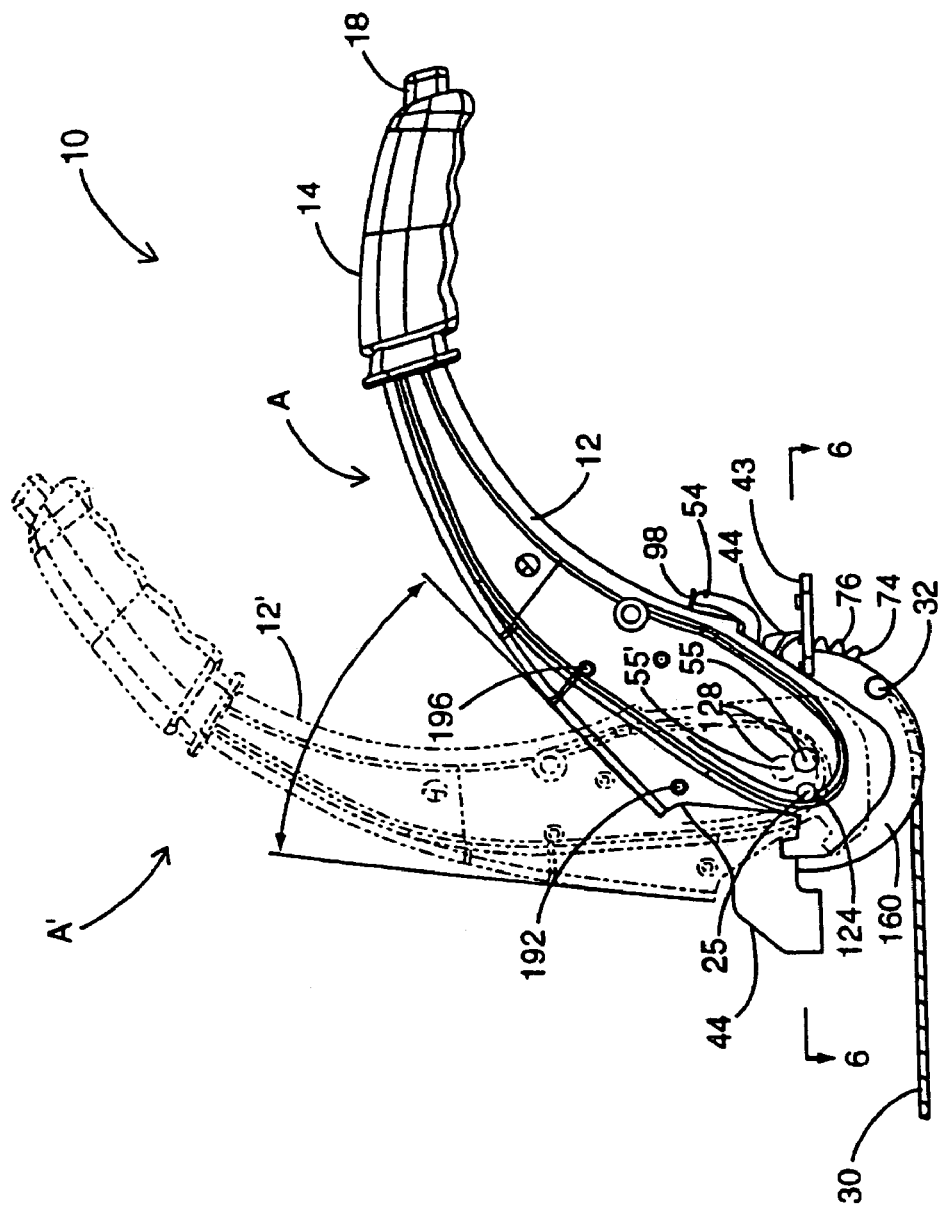
FIG. 3 is a side view of the actuator of FIG. 1, showing the other side thereof.

Referring to FIG. 3, in use actuator 10 is operated by selectively positioning lever assembly A in either the brake-released position (shown in solid lines) or one of a plurality of brake-applied positions (one such position shown in stippled lines at 12'). As indicated above, lever assembly A rotates about lever axis 25, by manipulation of lever 12 by the vehicle operator.

Referring to FIG. 7, when actuator 10 is in the brake-released position, lever assembly A is positioned relative to mounting bracket 44 such that finger 54 engages free tang 98 of spring 94, thereby slightly unwinding spring 94 and allowing pinion 90 to rotate freely about pinion rivet 134, thus disengaging clutch subassembly 170. As a result, the self-adjusting cam subassembly 160, having sector teeth 76 engaged with pinion teeth 92, is "unlocked" relative to lever assembly A and capable of rotation in response to selfadjust spring 70. Any slack which may be present in cable 30, such as slack introduced during installation or introduced over time by casual cable stretch, is thus automatically taken up by a rotation of cam subassembly 160 in the brake-apply direction (clockwise in FIG. 7) when the actuator is in the brake-released position. Spring 70 is sized and of sufficient strength to provide a desired minimum residual tension in cable 30 but not cause an unintentional application of the vehicle parking brakes.

Figure 4:
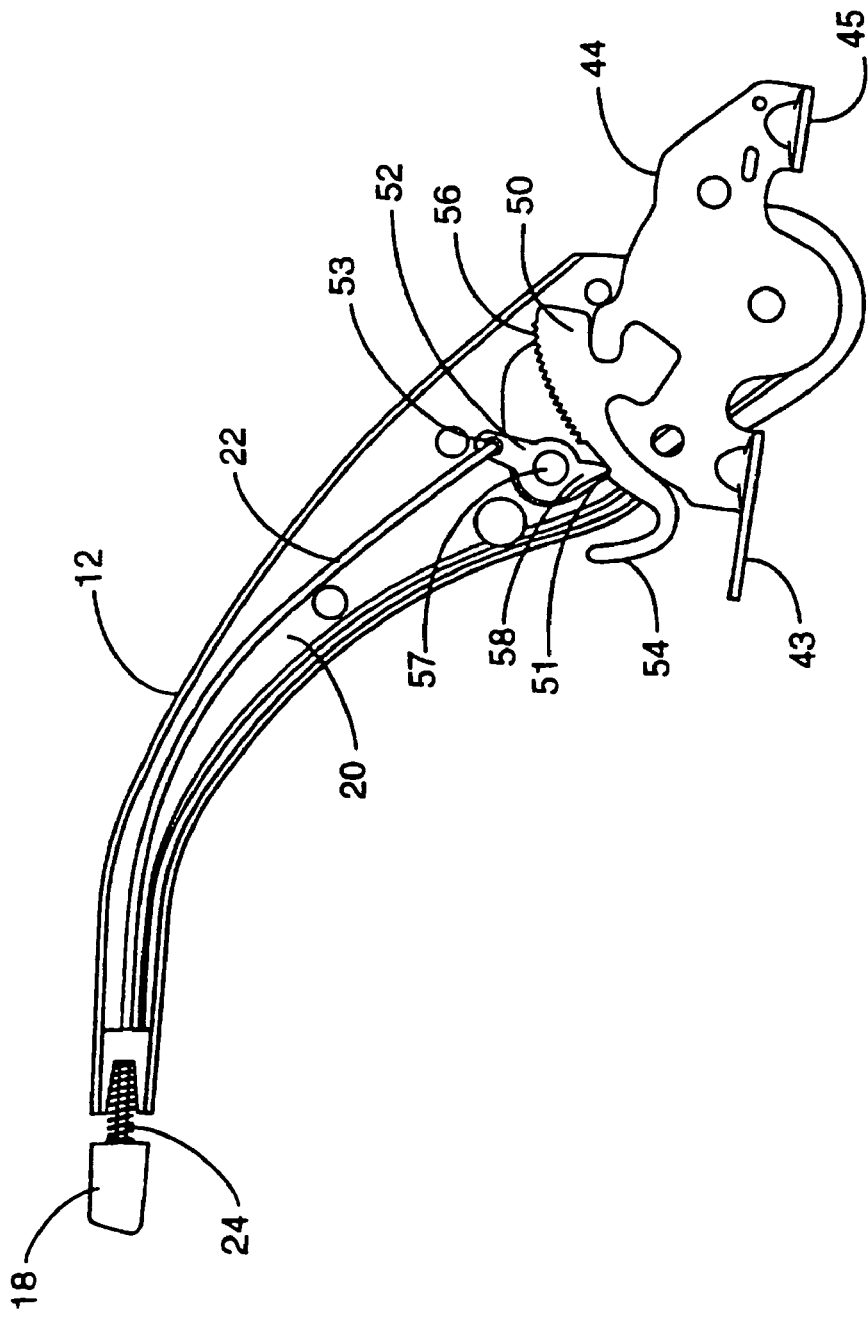
FIG. 4 is a cross-sectional schematic side view of the actuator of FIG. 1, showing the position lock assembly elements in isolation.
Figure 5:
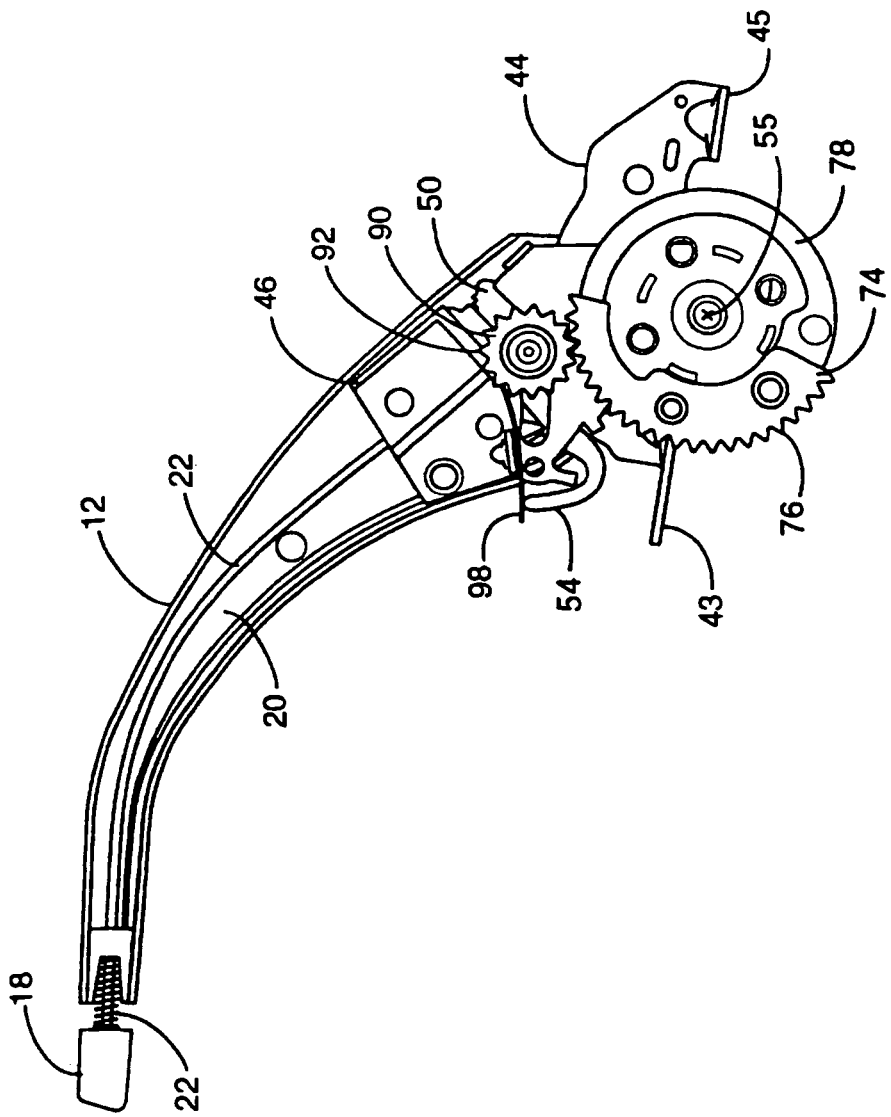
FIG. 5 is a second cross-sectional schematic side view of the actuator of FIG. 1, showing the self-adjust assembly elements in isolation.

Also, referring to FIG. 4, when actuator 10 is in the brake-released position, position locking assembly B maintains nose 58 in contact with sector 50, adjacent un-toothed shoulder 51 and, thus out of engagement with teeth 56.

Referring to FIG. 8, when lever assembly A is rotated out of the brake-released position to a brake-applied position, the rotation of lever assembly A moves clutch subassembly 170 away from finger 54, causing finger 54 to release tang 98 and permitting clutch spring 94 to contract and thereby tightly grasp or embrace pinion 90. As described above, since tang 96 of clutch spring 94 is anchored to cover plate 48 (i.e. part of lever assembly A), spring 94 cannot rotate and, thus, pinion 90 is thus not permitted to rotate, particularly in the clockwise direction (as viewed in FIGS. 7, 8). Cam subassembly 160 is thus "locked" to lever assembly A through the co-action of pinion teeth 92 and sector 74. The rotation of lever assembly A in the brake-apply direction tends to further wind the clutch spring 94 around hub 91, thereby increasingly prohibiting rotation of pinion 90. As a result of the locked condition, pinion 90 is unable to rotate and an operative locked connection is established between the lever assembly A and the self-adjusting cam subassembly 160. As lever assembly A is rotated towards a brake-apply position, cam subassembly 160 thus also travels around lever axis 25 due to the eccentric mounting of cam subassembly 160, and cable 30 is wound on to guide 231(see FIG. 8) to increasingly tension and take up cable to apply the parking brake system.

Also, as lever assembly A is advanced in the brake-apply direction, pawl 52 is rotated about lever axis 25 to permit nose 58 to come into contact with teeth 56 of sector 50. The angle of teeth 56 of sector 50 relative to nose 58 of pawl 52 permits nose 58 to advance over teeth 56 without depressing button 18 of pawl release subassembly 155. Thus, the vehicle operator may simply rotate lever 12, although button 18 may be depressed if desired. Once nose 58 has advanced from shoulder 51 to engage teeth 56, pawl subassembly 150 will ratchet over the teeth of ratchet sector 50 and act to prevent the reverse rotation of lever 12 in the brake-release direction (i.e. clockwise in FIG. 4). Lever 12 is advanced in the brake-apply direction, thereby tensioning cable 30, until a desired lever of brake cable tension is achieved to set the vehicle parking brakes sufficiently to the operator's satisfaction. The lever may have an operable rotation range of about 40 degrees, for example. To release the brakes, button 18 is depressed to release nose 58 from teeth 56 for enabling movement of the lever in the releasing direction. When button 18 is depressed, pawl nose 58 rotates about the pawl pivot 57 to disengage nose 58 from sector teeth 56. Lever 12 may then be rotated, while button 18 is depressed, back to the brake-released position.

By providing an eccentric positioning of cam axes 55 relative to lever axis 25, the actuator achieves a variable mechanical advantage as the actuator lever is stroked to full position. Thus, the amount of operator input force necessary to apply the parking brake throughout the lever stroke is reduced. Also, advantageously, the overall lever length can be reduced. For example, an eccentric offset "e" of 15 mm results in a significant increase in the maximum mechanical advantage achievable for an actuator given size.

Figure 9:
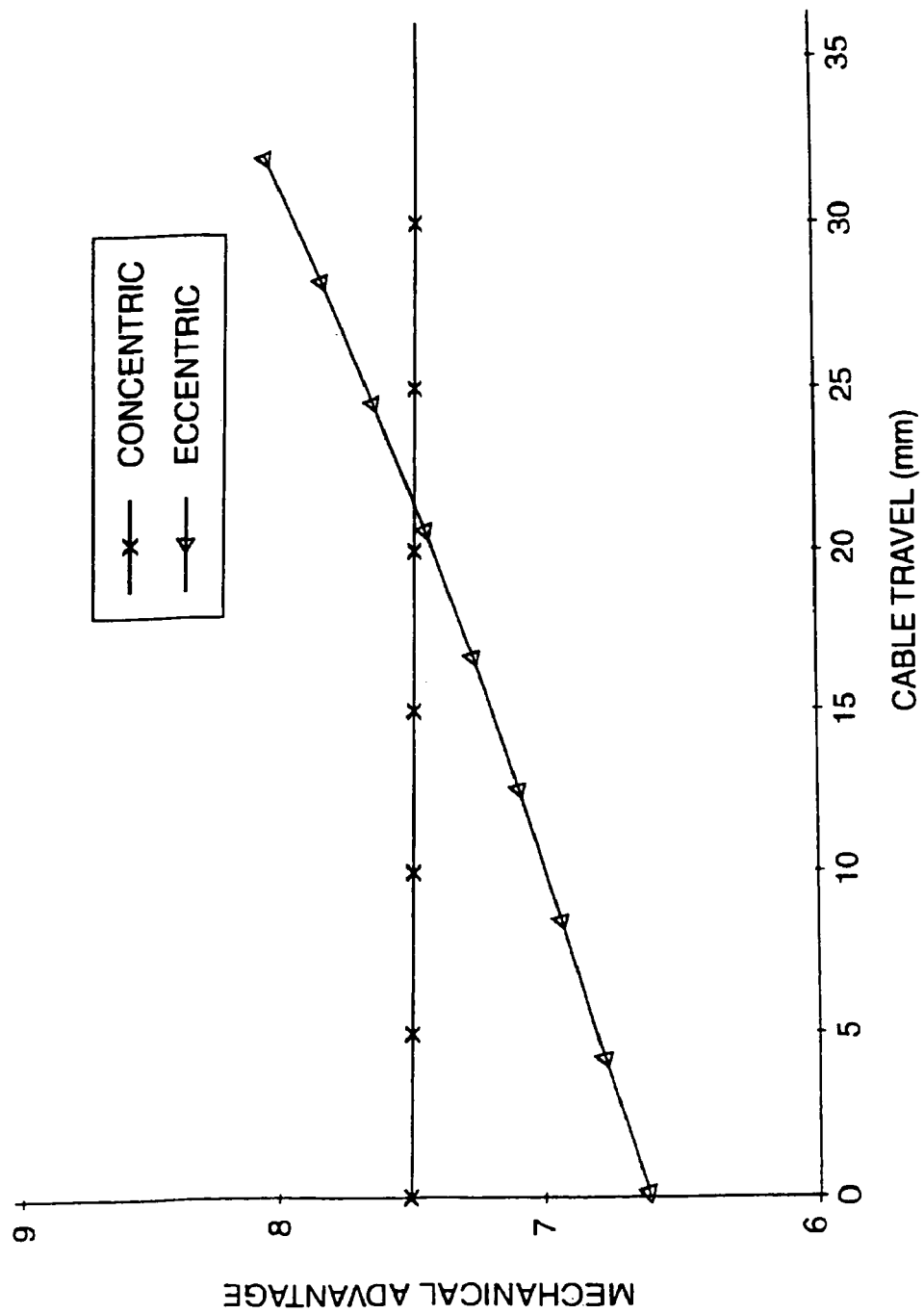
FIG. 9 is a chart plotting the mechanical advantage against cable travel.

The benefits of the illustrated actuator, in terms of available mechanical advantage per a given amount of cable travel, is shown in FIG. 9. The "Eccentric" line of FIG. 9 represents an actuator according to the present invention having a 350 mm lever, 45 mm radius cam and a 15 mm offset between the cam and lever axes. Also shown in FIG. 9, for comparison purposes, is a comparably-sized (in terms environmental space requirements) concentric actuator ("Concentric" v line). The "Eccentric" line clearly demonstrates that a small eccentric mounting yields a marked benefit, in terms of mechanical advantage, over a comparably-sized concentric design.

Figure 10:
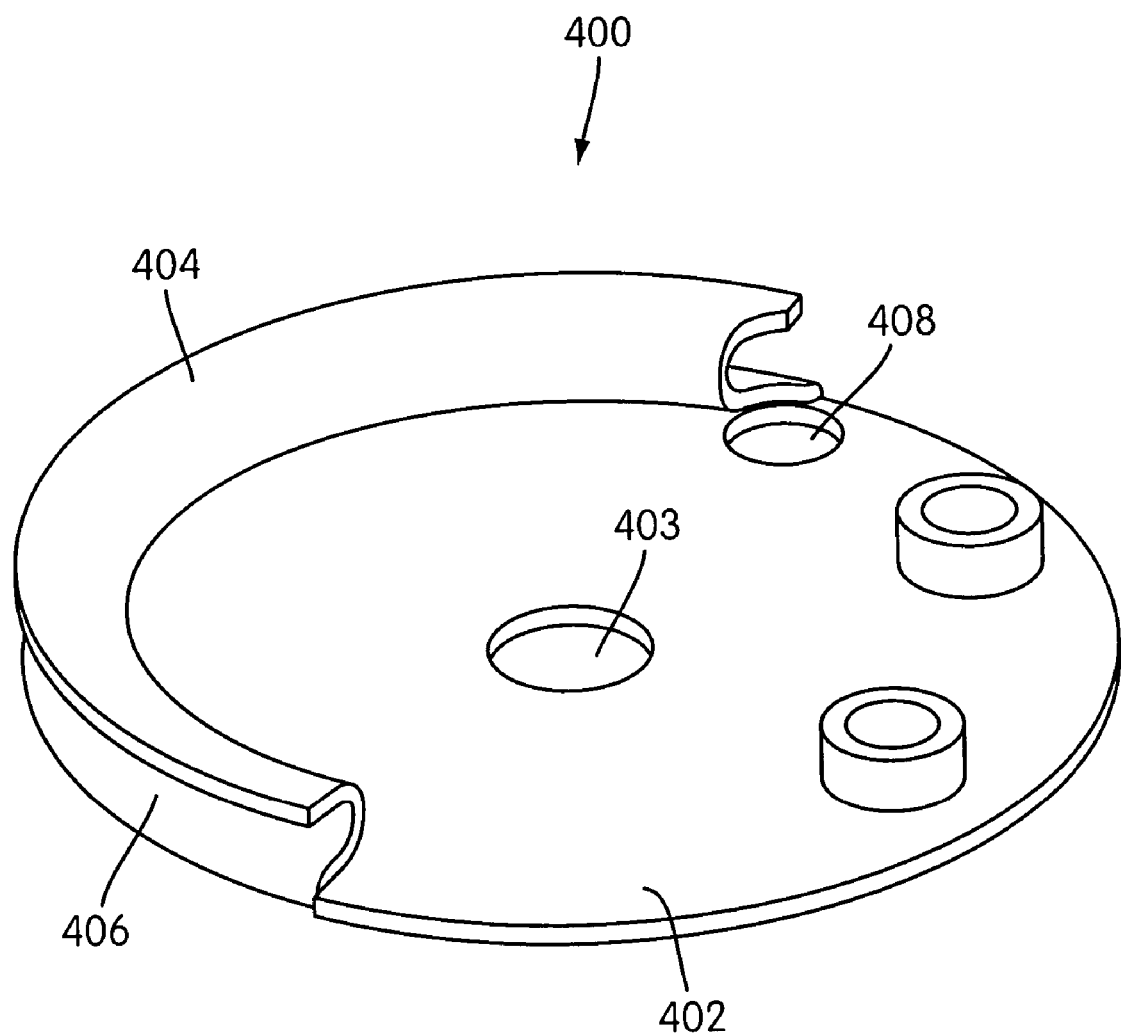
FIG. 10 is a perspective view of a one-piece take-up reel or cam in accordance with an aspect of the present invention.

Turning now to FIG. 10, it illustrates a one-piece take-up reel or cam member 400. The cam member 400 may be used in the prior art construction discussed above, or any other type of brake actuator. The cam member 400 includes a generally circular disc-shaped body 402. The body 402 has a central opening 403 for mounting to the pivot rivet 128 in the above-described construction. Slots may be formed as in cam portions 78 and 80 for mounting a separately formed drum thereto. The peripheral edge of the body 400 has an integrally formed flange 404 that is bent into a trough or U-shape with integral opposing side walls to define a groove 406 to act as a cable guide. An aperture 408 is provided for receiving a cable head, such as cable head 32.

The body 402 is formed by a progressive stamping operation from a piece of suitable gauge sheet metal, such as steel. Specifically, the body 402 is initially stamped to form its general shape along with flange 404, hole 403, aperture 408, and any other slots or holes, such as for mounting a drum, such as drum 72. The body is further stamped in a subsequent die to bend the flange 404 generally perpendicularly to the body 400; however, the bending of the flange may be done in the same stamping as the formation of the cam body 402. The free end of the flange 404 is then deformed further to bend it over to create the U-shape and define the groove 406. The deforming of the free end of the flange 408 is preferably done by a subsequent stamping die. One skilled in the art can readily appreciate the particular die shapes required to form the cam member 400 as illustrated, and thus detailed illustrations of the particular stamping dies are not being provided. Other methods of forming these structures may also be used.

One advantage of using the integrally formed U-shaped cable guide is that part count is reduced, as two cooperating parts do not have to be assembled to define the two side walls of the U-shaped guide. Additionally, in prior art constructions where two parts are assembled to define the two sides of the U-shaped guide, there is a tendency for the brake cable to "wedge" between those parts, which is undesirable. In contrast, by having the two side walls of the U-shaped guide integral, this problem is eliminated, as there is no interface between two parts for the cable to wedge into.

Figure 11:
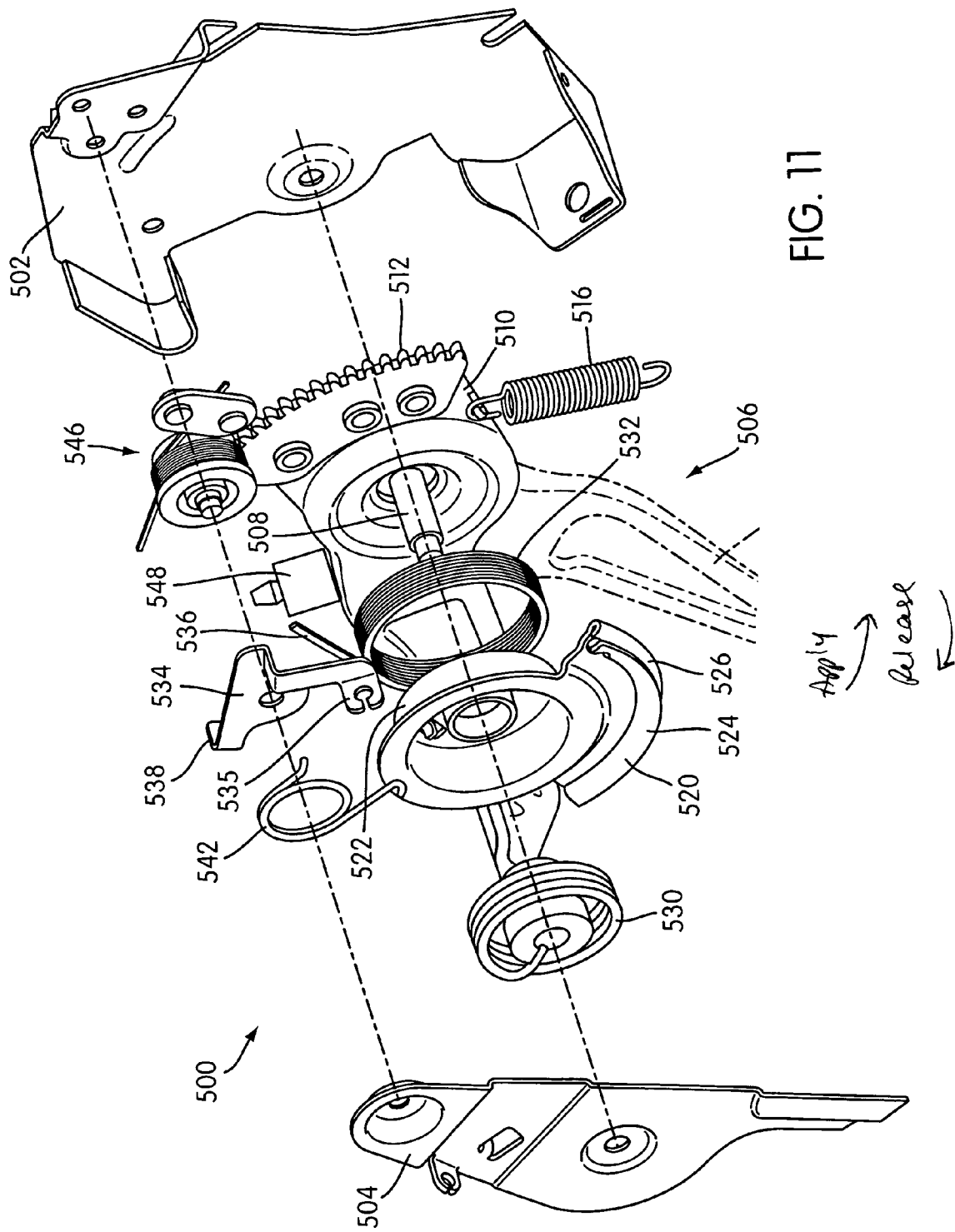
FIG. 11 is an exploded perspective view of a brake actuator incorporating a one-piece take-up reel and drum in accordance with another aspect of the invention.

FIG. 11 shows a foot-operated type brake actuator 500. The actuator 500 includes a mounting bracket 502 for mounting the actuator 500 within the passenger compartment of a vehicle, usually beneath the driver's side of the dashboard. A pedal lever 506 is pivotally mounted to the bracket 502 on a pivot rivet 508 and a cover plate 504 is fixedly mounted to the lever 506 opposite the bracket 502. The lever 506 includes a body portion 510 having an arcuate sector 512 thereon and a lever arm 514 fixed to the body portion 510. In the Figure, the brake apply direction is counterclockwise, and a spring 516 is connected between the lever 506 and the bracket 502 to bias the lever in the brake releasing direction (clockwise in FIG. 11) opposite the brake applying direction (counterclockwise). This ensures that the lever 506 is returned to the full released position in the event there is insufficient cable tension to pull it to that position.

A one-piece cam-and-drum member 520 is rotatably mounted to the lever 506 about the pivot rivet 508. The member 520 is formed as one integral part including a protruding drum portion 522 and a cam or take-up reel portion 524 integral with the drum portion 522. The cam portion 524 provides a groove 526 defining a cable guide for receiving the brake cable 30 and enabling winding thereof onto the cam portion 524. This manner in which this component is formed will be described in further detail hereinbelow.

A take-up spring 530 is mounted within the hollow of the drum portion 522 and has one end connected to the cover plate 504 and another end connected to the drum portion 522, or some other portion of the cam-and-drum member 520. The spring 530 rotatably biases the cam-and-drum member 520 in a slack take-up direction (which. is the same as the brake applying direction) relative to the lever 506 to wind the cable thereon for taking up cable slack in a manner which is described hereinbelow.

A clutch spring 532 embraces an exterior surface of the drum portion 522 and is connected to the lever 506 to releasably couple the cam-and-drum member 520 to the brake actuator lever 506. Generally, the clutch spring operates much in the way described above. One end of the clutch is fixed to the lever 506 and the other end 536 is free. Normally, as the brake lever 506 is being moved in the brake applying direction, the spring 532 remains contracted to frictionally embrace the exterior surface of the drum portion 522 (and thus the drum portion 522 may be referred to as a spring embraceable structure). This frictional engagement, together with an end of the spring 532 being fixed to the lever 506, couples the cam-and-drum member 520 to the lever 506 so that they move together, thus enabling tension to be applied to the brake cable for purposes of activating the brake system of the vehicle. When the lever 506 is returned to its brake released position, the free end 536 of the spring 532 engages a tab or other surface on the bracket 502 so that the spring 532 is expanded. The decouples the cam-and-drum member 520 from the lever 506 so that the take-up spring 530 can take-up and slack in the brake cable and ensure it has proper tension. Upon movement of the lever 506 in the brake applying direction, the slight friction between the spring 532 and the drum portion 522 will cause the cam-and-drum member 520 to rotate sufficiently to disengage the free end 536 from the bracket, whereby the spring 532 again contracts as discussed above.

A torsion clutch assembly 546 has the same general construction and functions in the same general way as clutch subassembly 170 discussed above, with the following exceptions. In the embodiment of FIG. 11, a pinion gear of the clutch assembly 546 engages the sector 512 on the lever 506 to prevent it from being moved in the brake releasing direction, but functions in a one-way manner to enable the lever to be moved in a brake-applying direction. A clutch release lever 534 is pivotally mounted to the bracket 502 and has a spring receiving portion 535 for retaining a free end of a torsion clutch spring in the clutch assembly 546. The lever 534 is connected to a manual release handle (not shown) by which operation of the handle pivots the lever 534. This movement in turn moves the free end of the torsion clutch spring in the clutch assembly, which in turn expands the clutch spring and enables a pinion gear of the assembly 546 to freely rotate. This enables the tension of the brake cable to pull the lever and cam-and-drum member 520 back in the brake releasing direction.

A contact switch 548 is provided on the lever 506 and engages the bracket 504 when the brake lever 506 is in the fully released position. This can be used to send a signal to turn off an indicator light in the passenger compartment indicating that the brake has been applied.

Figure 12:
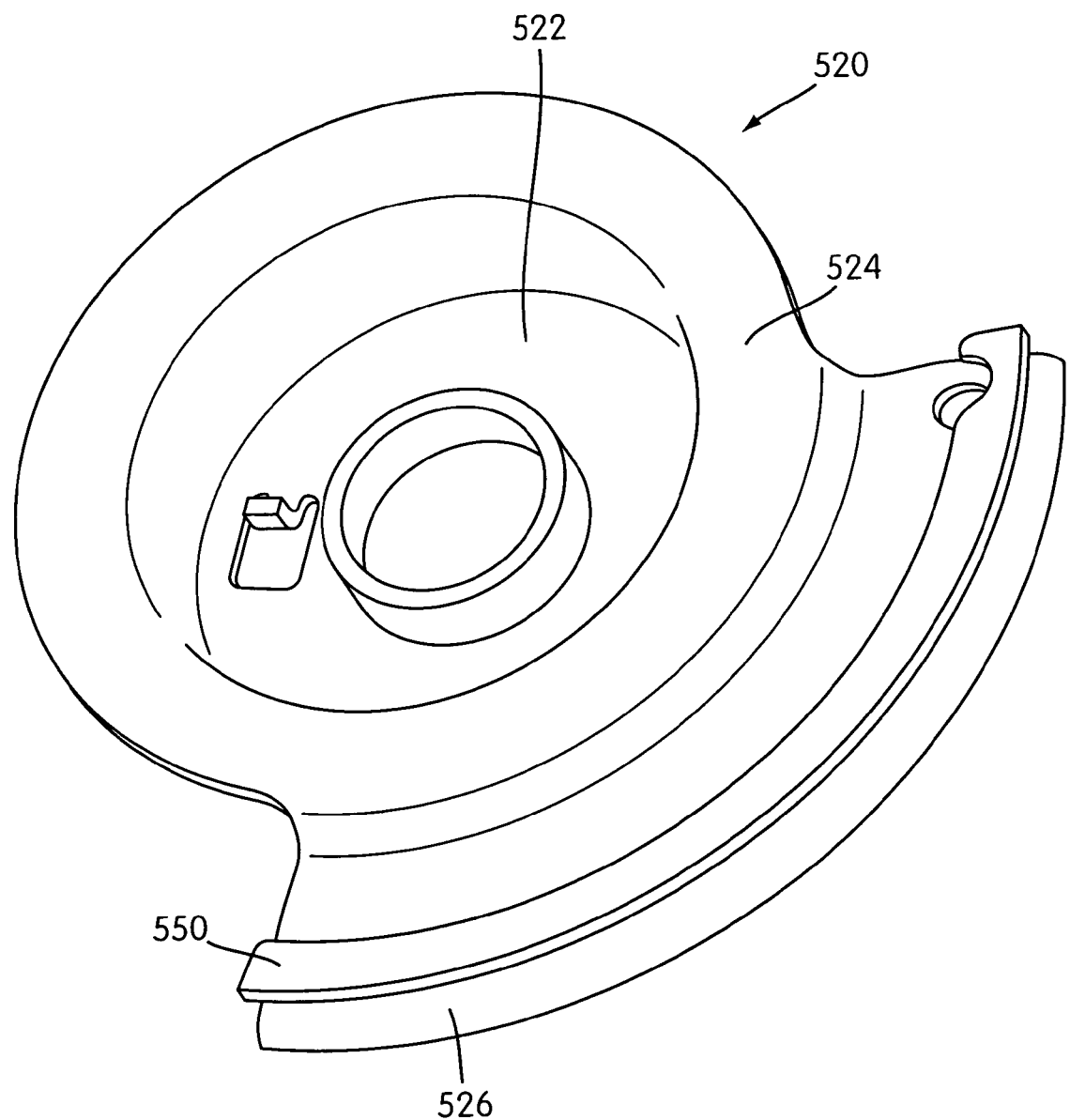
FIG. 12 is a perspective view of the one-piece take-up reel and drum in the actuator of FIG. 11.
Figure 13:
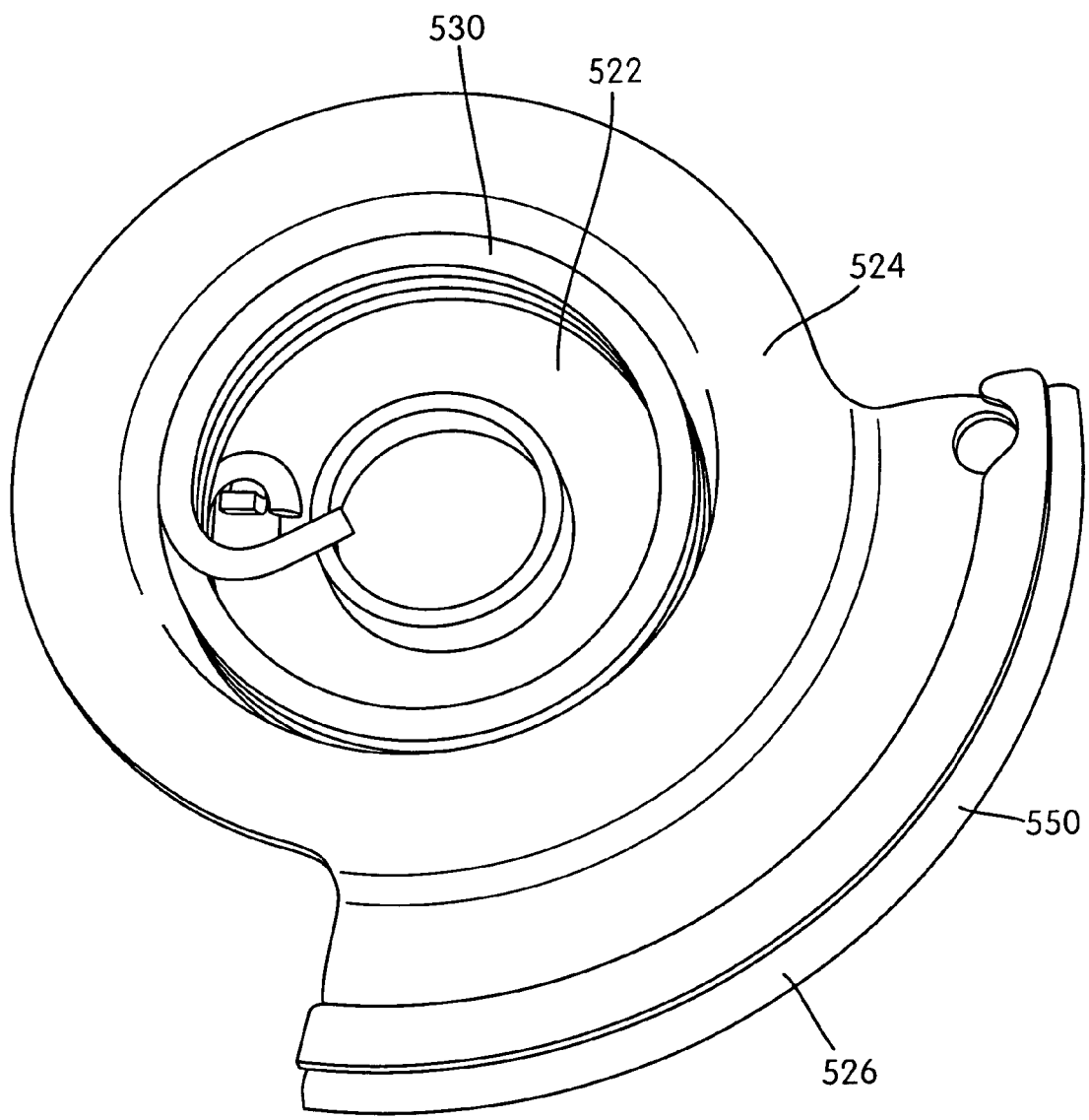
FIG. 13 is a perspective view of the take-up reel and drum in FIG. 12, taken from the opposite side thereof.

Referring more specifically to the cam-and-drum member 520, as illustrated in FIGS. 12 and 13, the cam-and-drum member 520 is formed in a similar fashion to the one-piece cam 400 described above, with the exception that the drum portion 522 is formed integral with the cam portion 524. Specifically, member 520 is formed by a progressive stamping operation from a piece of sheet metal, such as steel. The member 520 is initially stamped to form its general shape, including the drum portion 522 and the general disc-shape of the cam portion 524. This may be done in a single stamping operation, or in multiple operations. A flange 550 is formed along the edge of the cam portion 524. This flange 550 is further stamped in a subsequent die to bend the flange 550 at an angle, preferably generally perpendicularly, to the body; however, the bending of the flange 550 may be done in the same stamping as the formation of the cam portion 524. The free end of the flange 550 is then deformed further to bend it over to create the U-shape and define the groove 526. The deforming of the free end of the flange 550 is preferably done by a subsequent stamping die. One skilled in the art can readily appreciate the particular die shapes required to form the cam-and-drum member 520 as illustrated, and thus detailed illustrations of the particular stamping dies are not being provided. Other methods of forming these structures may also be used.

This cam-and-drum member 520 may be used in the construction of FIGS. 1-9, or any other brake actuator. Additionally, it is contemplated that the cam portion may be provided by one flanged part that is integral with the drum portion, and another part that is attached thereto to define the cable guide. This would be similar to the construction in FIGS. 1-9 wherein the inner and outer cams 78 and 80 are assembled to define cable guide 231, but the drum would be integral as one piece with the inner cam 78. Thus, the cam portion integral with the drum portion would define only one side of the guide, while the other side of the guide would be defined by the separately attached cam member (e.g., cam member 80).

Figure 14:
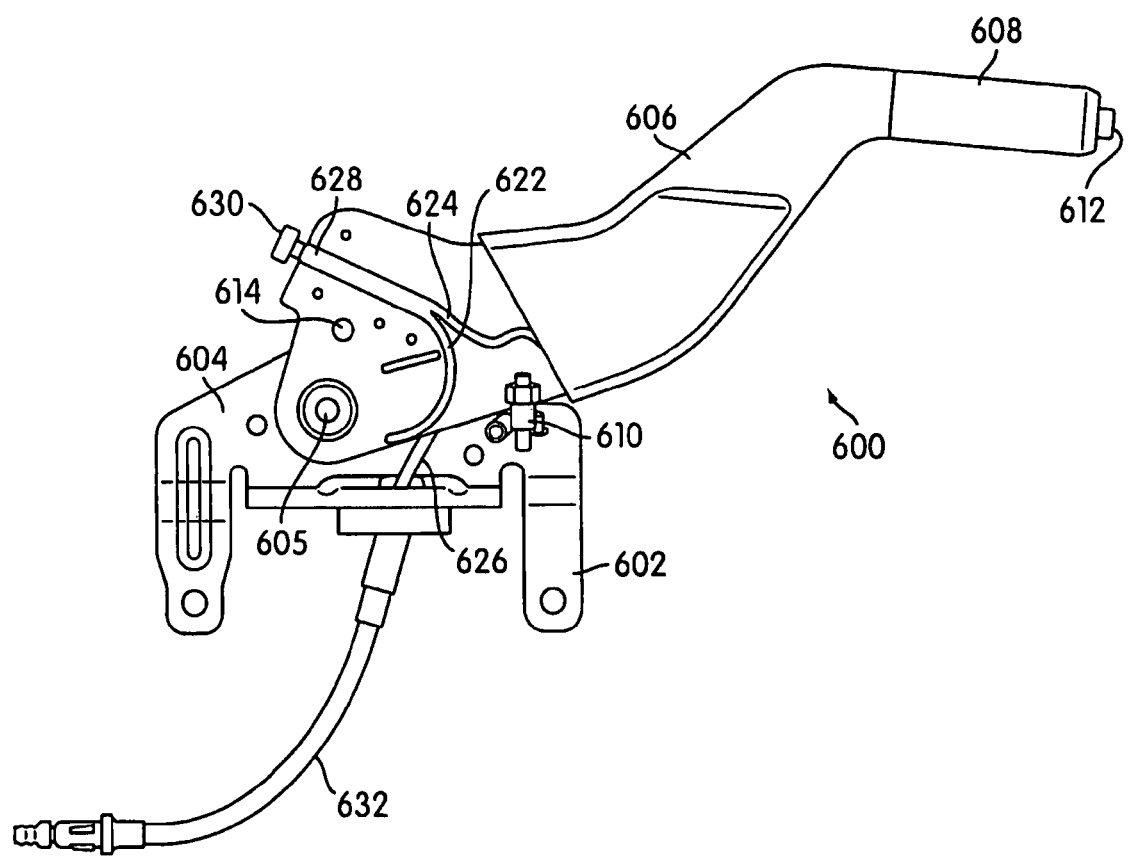
FIG. 14 is a profile view of a brake actuator incorporating a cam member fixed to the actuator lever.

FIG. 14 illustrates another embodiment of a brake actuator 600. This brake actuator 600 has a mounting bracket 602 with an upstanding vertical wall 604. A brake lever 606 is pivotally connected to the wall 604 by a pivot rivet 605. The brake lever 606 has a hand grip 608 at the free or distal end thereof. A contact switch 610 is mounted on the wall 604 and is contacted by the lever 602 in its brake released position to transmit a signal indicating that the brake is released.

On the side of the lever 602 that cannot be seen in FIG. 14 is a conventional pawl and ratchet sector arrangement for securing the lever 602 in a brake applying position. As is conventional in the art, a toothed arcuate sector is mounted on the wall 604 concentric with the pivot rivet 605, and a spring-biased pawl engages that sector to maintain the brake lever 602 in a brake applying position. A rod (also not shown) is connected between the pawl and button 612 such that depressing the button 612 (usually with the user's thumb) shifts the rod to disengage the pawl and free the lever 602 for movement back to its brake releasing position. This mechanism is similar to that shown in FIGS. 1-9.

On the side of the lever 602 seen in FIG. 14, there is provided a cam member 614. The cam member 614 is fixed to the lever 602 by riveting, welding, or in any other suitable way. The cam member 614 is shown in detail in FIGS. 15 and 16.

Figure 15:
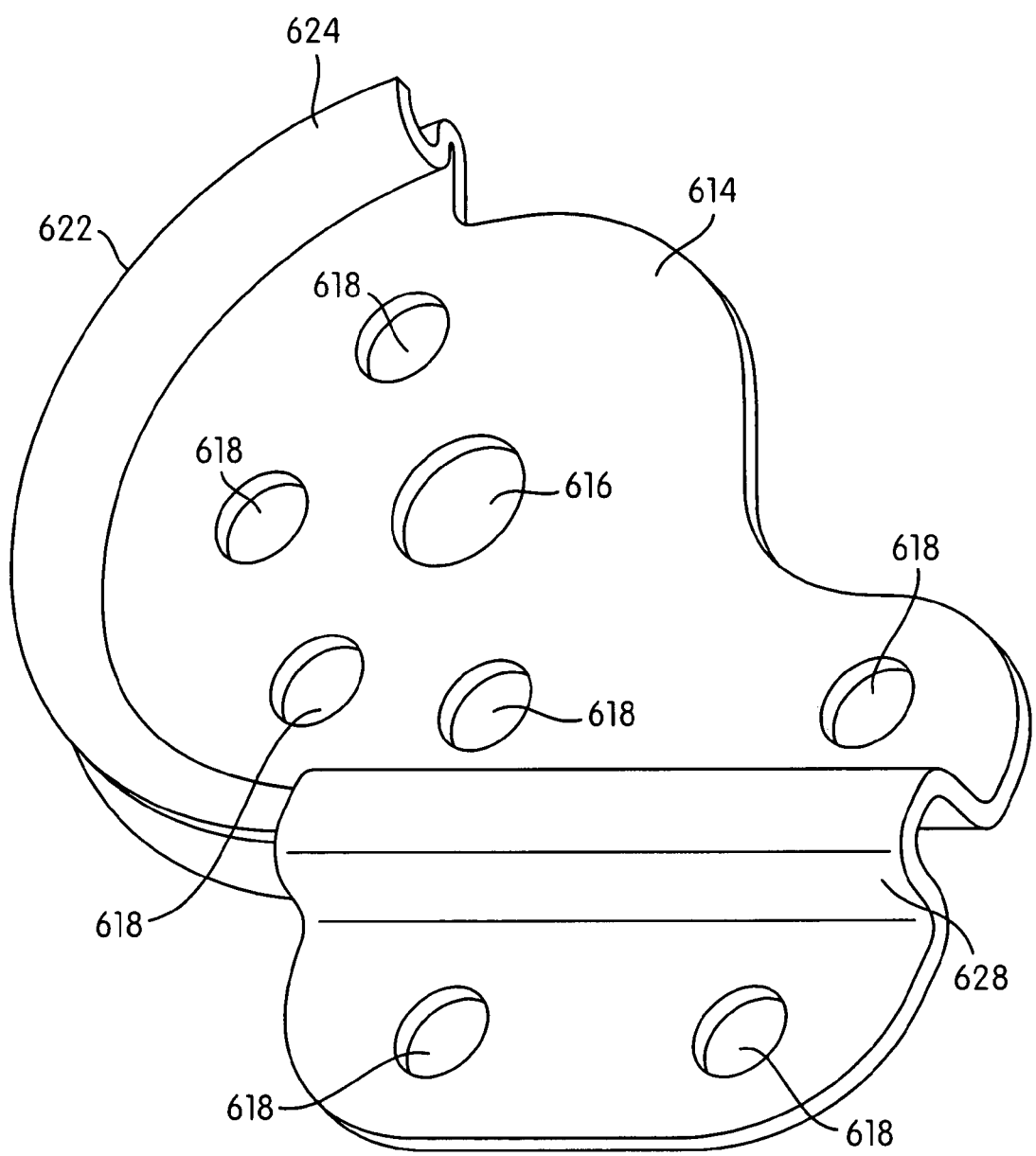
FIG. 15 is a perspective view of the cam member used in the brake actuator of FIG. 14.
Figure 16:
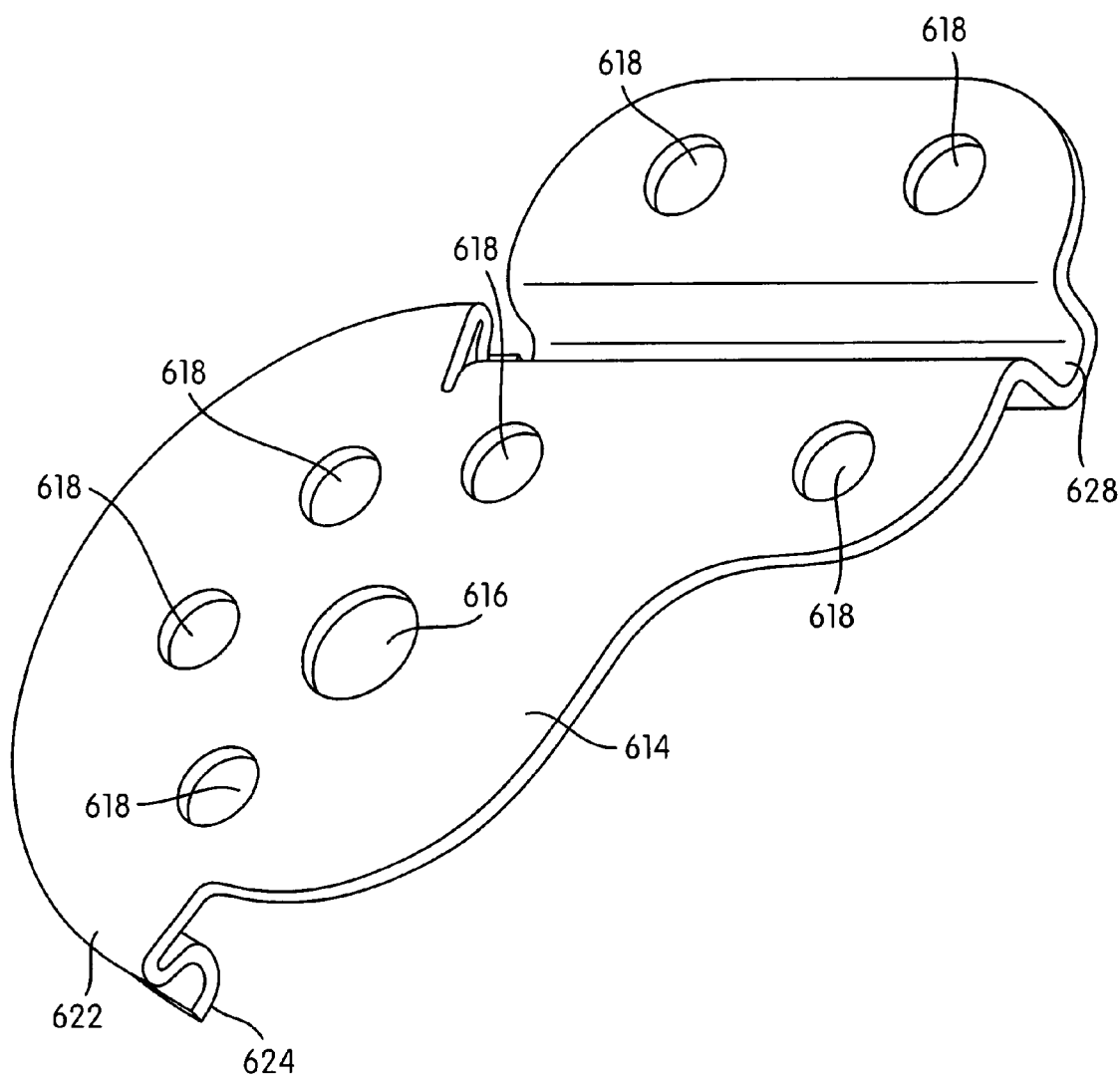
FIG. 16 is a perspective view of the cam member of FIG. 15, but taken from the opposite side.

As shown in FIGS. 15 and 16, the cam member 614 is formed from a piece of sheet metal, and is preferably formed using the types of stamping operations discussed above. The cam member 614 has a main body 616 with an aperture 618 for the pivot rivet 605. Other apertures 620 are provided for rivets that may be used to fix the cam member 614 to the lever 602.

A flange 622 is provided concentric to the opening 618 and is bent into a general U-shape to form a cable guide 624. This guide 624 may be formed in the same manner as discussed above and enables a brake cable 626 to be wound thereon as the brake lever 602 is pivoted in its brake applying direction. When attaching the brake cable 626 it is extended around the guide 624 and its free end is inserted through a straight channel 628, which is formed by deforming the main body 614. The cable 626 has a head 630 thereon that engages the end of the channel 628.

A guide tube 632 is shown and sheaths the cable 626 as it extends away from the actuator 602.

As an alternative to using a cam member that is formed separately and fixed to the actuator lever, the cam member may be stamped or otherwise formed integral with the wall of the actuator lever. For example, when forming the lever by stamping, a flange similar to flange 622 could be punched from the sheet metal wall of the lever's main body concentrically with the lever's pivot axis. Then, the flange could be bent by further stamping, or some other operation, to deform it into a generally U-shaped cable guide, similar to the guide 624. This is advantageous because it further reduces the part count and assembly costs.

It should be understood that any aspects described herein can be applied to any type of brake actuator, whether hand or foot generated. As such, the disclosed embodiments are not intended to be in any way limiting.

While the above description constitutes the preferred embodiments, it will be appreciated that the present invention is susceptible to modification and change without departing from the fair meaning of the proper scope of the accompanying claims.

What is claimed:

1. A method for forming a brake actuator for applying tension to a brake cable connected to the brake system of a motor vehicle, the method comprising:
   providing a brake actuator lever;
   providing a cam member, including progressively stamping a sheet metal flange portion that is part of and integral and continuous with the cam member to (a) initially bend, by stamping, the flange portion at an angle to the cam member and then (b) further bend, by subsequent stamping, the angle portion of the flange portion into a general U-shape so as to define a cable guide with opposing side walls for receiving the brake cable and enabling winding thereof onto the cam member, wherein the opposing side walls are integral and continuous as one-piece with the cam member;
   providing a mounting bracket; and
   pivotally mounting the brake actuator lever and the cam member for pivotal movement relative to the mounting bracket in brake applying and releasing directions, the cam member being provided on the brake lever such that the movement of the brake lever in the brake applying direction winds the cable onto the cam member for applying tension to the cable for activating the brake system.

2. A method according to claim 1, wherein said mounting the brake actuator lever and the cam member comprises pivotally mounting the actuator lever for pivotal movement relative to the mounting bracket.

3. A method according to claim 2, wherein the cam member is formed separately from the brake actuator lever, and wherein said providing the cam member comprises: stamping a piece of sheet metal to initially form a cam member having the sheet metal flange portion; and then progressively stamping the flange portion as aforesaid into the general U-shape so as to define the cable guide.

4. A method according to claim 3, wherein said mounting the brake lever and the cam member comprises rotatably mounting said cam member for rotation relative to said brake actuator lever; and
   wherein said method further comprises:
      providing a clutch releasably coupling said cam member to said brake actuator lever such that said cam member rotates relative to said mounting bracket with movement of said brake actuator lever at least in the brake applying direction, thereby winding the brake cable onto the cam member and applying tension to the cable for activating the brake system, said clutch being operable to release said cam member from the lever such that said cam member is able to rotate relative to said brake actuator lever at least when said lever is in a brake released position; and
      connecting a spring to the cam member, said spring biasing said cam member in a slack take-up direction relative to said lever to wind the cable thereon for taking up cable slack when said clutch releases said cam member from the lever.

5. A method according to claim 1, wherein the brake actuator lever includes a wall, and wherein the cam member is a portion of the wall and integral and continuous as one-piece with the wall,
   wherein the act of providing the cam member includes stamping the sheet metal flange portion from the wall of the brake actuator lever comprising the cam member.

6. A method for forming a brake actuator for applying tension to a brake cable connected to the brake system of a motor vehicle, the method comprising:
   stamping a single piece of sheet metal to initially form a cam-and-drum member as an integral and continuous one-piece part including a protruding drum portion and a cam portion integral and continuous with the drum portion, the cam portion having a flange portion integral and continuous with the cam portion;
   progressively stamping the flange portion to (a) initially bend, by stamping, the flange portion at an angle to the cam member and then (b) further bend, by subsequent stamping, the angle portion of the flange portion into a general U-shape so as to define a cable guide for receiving the brake cable and enabling winding thereof onto the cam portion, wherein the opposing side walls are integral and continuous as one-piece with the cam-and-drum member;
   providing a mounting bracket;
   mounting a brake actuator lever for movement relative to the mounting bracket in brake applying and releasing directions;
   rotatably mounting said cam-and-drum member for rotation relative to the brake actuator lever;
   providing a clutch releasably coupling the cam-and-drum member to the brake actuator lever such that the cam-and-drum member rotates relative to the mounting bracket with movement of the brake actuator lever at least in the brake applying direction, thereby winding the brake cable onto the cam portion and applying tension to the cable for activating the brake system, the clutch being operable to release the cam-and-drum member from the lever such that the cam-and-drum member is able to rotate relative to the brake actuator lever at least when the lever is in a brake released position; and
   connecting a spring to the cam-and-drum member, the spring biasing the cam-and-drum member in a slack take-up direction relative to the lever to wind the cable thereon for taking up cable slack when the clutch releases the cam-and-drum member from the lever.

7. A method according to claim 6, wherein said mounting the brake actuator lever comprises pivotally mounting the actuator lever for pivotal movement relative to the mounting bracket.

8. A method for forming a brake actuator for applying tension to a brake cable connected to the brake system of a motor vehicle, the method comprising:
   stamping a piece of sheet metal to initially form a cam member having an integral and continuous flange portion;
   progressively stamping said flange portion to (a) initially bend, by stamping, the flange portion at an angle to the cam member and then (b) further bend, by subsequent stamping, the angle portion of the flange portion into a general U-shape with opposing side walls integral and continuous as one-piece so as to define a cable guide for receiving the brake cable and enabling winding thereof onto the cam member, wherein the opposing side walls are integral and continuous as one-piece with the cam member;
   providing a mounting bracket;
   pivotally mounting a brake actuator lever for pivotal movement relative to the mounting bracket; rotatably mounting said cam member for rotation relative to said brake actuator lever;

providing a clutch releasably coupling said cam member to said brake actuator lever such that said cam member rotates with pivotal movement of said brake actuator lever relative to said mounting bracket at least in a brake applying direction relative to said mounting bracket, thereby winding the brake cable onto the cam member and applying tension to the cable for activating the brake system, said clutch being operable to release said cam member from the lever such that said cam member is able to rotate relative to Said brake actuator lever at least when said lever is in a brake released position; and connecting a spring to the cam member, said spring biasing said cam member in a slack take-up direction relative to said lever to wind the cable thereon for taking up cable slack when said clutch releases said cam member from the lever.

* * * * *